CONVERSION APPARATUS AND METHOD

Filed Sept. 8, 1964

INVENTOR
GORDON R. PARTRIDGE

BY Rines and Rines

ATTORNEYS

INVENTOR
GORDON R. PARTRIDGE

BY [signature]

ATTORNEYS

United States Patent Office 3,426,187

Patented Feb. 4, 1969

3,426,187

CONVERSION APPARATUS AND METHOD

Gordon R. Partridge, Sudbury, Mass., assignor to General Radio Company, West Concord, Mass., a corporation of Massachusetts Filed Sept. 8, 1964, Ser. No. 394,790

U.S. Cl. 235—197 10 Claims

Int. Cl. G06g 7/26; G01r 23/02

ABSTRACT OF THE DISCLOSURE

This disclosure deals with the automatic conversion of electrical quantities into their reciprocal with the aid of a variable conductance matrix, the resultant conductance of which is varied in accordance with the quantity-to-be-inverted.

The present invention relates to electrical conversion apparatus and methods, being more particularly directed to electrical and electronic circuits for converting a measurement or other quantity into its reciprocal.

There are numerous applications in which it is required or desirable electrically to obtain the reciprocal of a quantity, such as, for example, the conversion of a measurement of the period of a periodic signal into the corresponding frequency. In connection with such frequency measurements, a digital computer can be employed and programmed to provide this reciprocal result, but with the attendant complexity of such computer equipment. In normal counting or similar measurements, however, it is generally necessary to effect such conversion by calculation from an indication representative of the period of a periodic signal, such calculation being non-automatic and time-consuming.

An object of the present invention, accordingly, is to provide a new, improved and simple electrical and/or electronic circuit and method that readily enables the automatic conversion of electrical quantities into their reciprocal. In summary, this is attained with the use of a variable conductance matrix the resultant conductance of which is varied in accordance with the quantity-to-be-inverted and to which a constant current is applied.

A further object is to provide a new and improved impulse counting system.

Other and further objects will be explained hereinafter and will be more particularly pointed out in connection with the appended claims.

Figure 1:
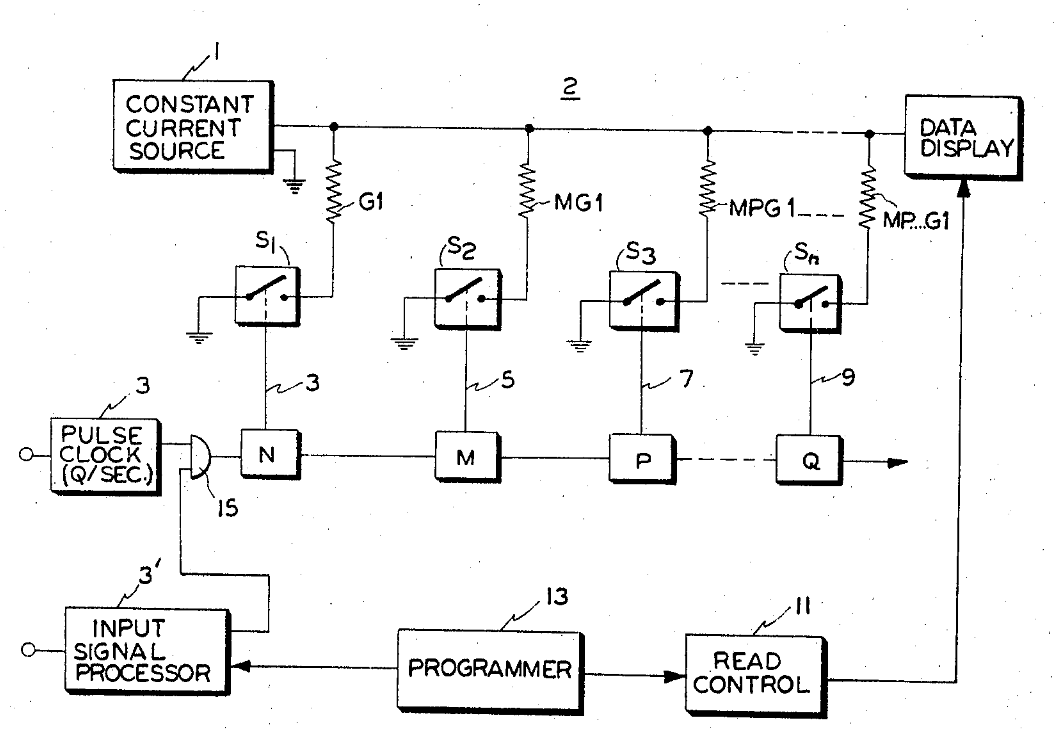
Figure 2:
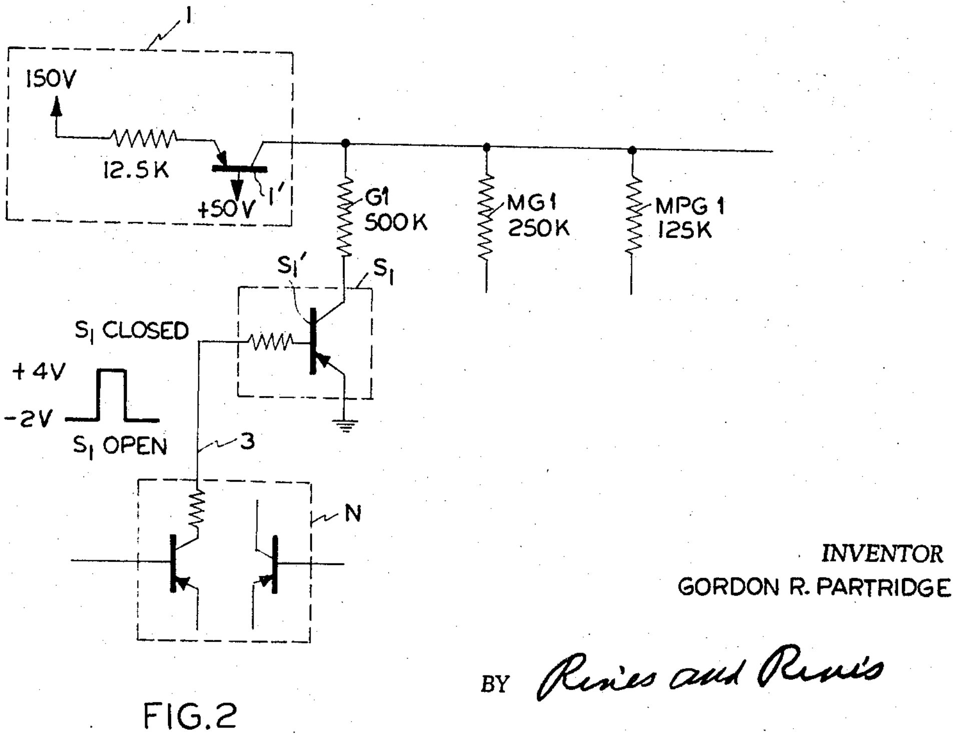
Figure 3:
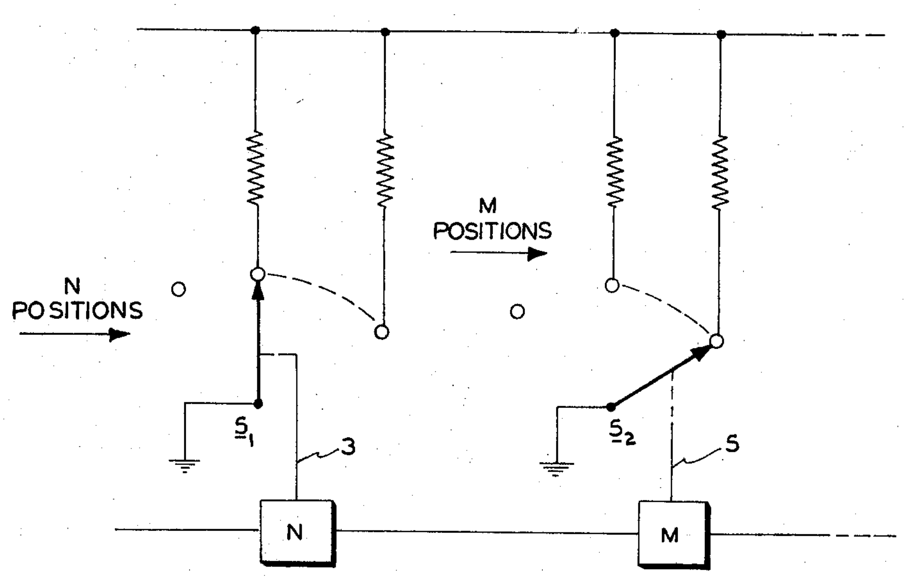

The invention will now be described in connection with the accompanying drawing, FIG. 1 of which is a block diagram of a preferred embodiment;

FIG. 2 is a fragmentary circuit diagram of suitable circuit elements for use in the system of FIG. 1; and FIG. 3 is a block diagram of a further circuit which may be connected with the blocks of FIG. 1 to provide a generalized situation.

Referring to FIG. 1, a constant current source 1, such as a very high resistance input circuit or an appropriately operated transistor stage, as shown in 1' in FIG. 2, applies current to a plurality of conductance branches G1, MG1, MPG1, up to MP . . . G1, constituting a matrix 2. Each of the conductance branches is shown permanently connected at its upper terminal to the constant current source 1, and at its lower terminal to respective switches S1, S2, S3 . . . $S_n$, such as, for example, transistor switches of the type shown at S1' in FIG. 2. Each of the switches is illustrated in its open position; but when closed, connects the corresponding conductance branch to ground and thus into complete circuit with the constant current source 1.

In accordance with a preferred but by no means limiting application of the invention of the important above-mentioned problem of converting a measurement of a varying period of a periodic signal into its reciprocal (namely, the frequency), an input circuit 3, such as, for example, an impulse clock, produces a train of impulses corresponding to the said period. These impulses are fed to successively serially connected counting stages N, M, P . . . Q, each one corresponding to and controlling a switching element S1, S2, S3 . . . $S_n$, as indicated by conductors 3, 5, 7 . . . 9, in accordance with the count of impulses accumulated in the counting stages. As an example, if the serial chain of counting circuits N, M, P . . . Q is of the binary type, by selecting conductances in the branches G1, MG1, MPG1, etc. of successively doubling values G1, 2G1, 4G1, etc., one will obtain across the matrix 2 in any conventional output circuit indicator or data display device 4, a voltage that is the ratio of the constant current from the source 1 to the resultant conductance of the matrix 2 at any instant of time. Through the operation of the successive switches S1, S2, S3, etc. by the respective binary counting circuits N, M, P, etc., the impulse count corresponding to the measure of the period of the input signal applied at 3 will effect connection into circuit of appropriate conductance branches to produce an effective or resultant matrix conductance representative of the impulse count and, in turn, corresponding to a measure of the period of the input periodic signal. Thus it can be stated that the effective or resultant conductance of the matrix 2 will be a measure of the period. This being so, the voltage at the data display 4, across the matrix 2, is proportional to the inverse of the period, or directly proportional to the frequency, and the desired conversion has been automatically effected.

In FIG. 2 typical values for such binary operation have been indicated for a constant current transistor stage 1' of the 2N2904 type and a 2N2218 switching transistor S1'. The notation "V" refers to voltage, and "K" refers to thousands of ohms.

While the above has been described in connection with a binary system, it should be evident that other types of impulse-providing and digital circuits may also be employed. As another illustration, let it be assumed that the successive counting stages N, M, P, etc., are successive conventional decade stages. In this event, the switches S1, S2, S3, etc., each become ten-position switches which may be successively operated to produce a full count corresponding to the measure of the period of the input periodic signal. Thus a resultant matrix conductance will be produced in the matrix 2 that is related to and varies in accordance with this count and thus corresponds to the period of the input signal.

The counting stages are not limited to either a binary or a decade operation, however. The circuit shown in FIG. 3, for example, may be connected with the system 1, 3, etc. of FIG. 1 to provide a generalized situation in which stage N counts by N's, stage M counts by M's, etc. Thus, if Q represents the number of input pulses per second applied from the input counter 3 to the first counter N, then $Q/N$ impulses result at the output of the counter N, the counter M will produce $Q/MN$ impulses, the counter P will produce $Q/MNP$ impulses, and so on.

While for the period-to-frequency conversion purposes herein mentioned it is desirable that a substantially linear relationship exist between variation of resultant conductance of the matrix 2 and the impulse measurement of the period of the signal being monitored, so that the hyperbolic or reciprocal output represents the frequency of the signal, it should be understood that, from a more generalized point of view, other laws of variation of dynamic change of the matrix conductance with input signal can be employed, continually automatically producing a quantity representing the ratio of the input or numerator quantity to the denominator. Similarly, from the broadest point of view, the variation of the effective conductance of the matrix 2 may be effected in other ways than by switching devices as, for example, by the employment of variable conductance elements responsive to and controlled by variation in an input signal.

In the complete system shown in FIG. 1, a signal processing circuit 3' of any well-known type, in conjunction with a conventional programming or timing circuit 13, may operate an AND gate 15 to enable an appropriate predetermined number of clock impulses from the input signal source 3 to pass to the first counting circuit N. The data display 4 may, if desired, be caused to be effective only at predetermined instants of time, as by means of a read control gate circuit 11 also controlled by the programmer circuit 13. Continual display without such programming may, of course, also be employed as initially described above and, indeed, other types of signal input and other circuits may readily be substituted, as is well known, to practice the invention; all such modifications being considered to fall within the spirit and scope of the invention as defined in the appended claims.

What is claimed is:

1. Apparatus for electrically converting an electrical quantity into its reciprocal, having, in combination, a constant current source provided with a pair of output terminals, a variable conductance matrix comprising a plurality of parallel conductance branches each provided with switching means for connecting the same into and out of circuit between said output terminals of the source, an output circuit connected across said matrix, and means for varying the resultant conductance of said matrix directly in accordance with said quantity and thus for producing a voltage in the output circuit representative of the reciprocal of the said quantity, the last-mentioned means comprising means actuating said switching means in response to said electrical quantity for connecting particular conductance branches between said output terminals depending upon a measure of said electrical quantity.

2. Apparatus as claimed in claim 1 and in which said means actuating said switching means comprises means responsive to said electrical quantity for producing a train of impulses corresponding to a measure of said quantity and means for connecting the impulse-producing means to the switching means.

3. Apparatus as claimed in claim 2 and in which said means for connecting the impulse-producing means to said switching means comprises a plurality of impulse counters.

4. Apparatus as claimed in claim 3 and in which said counters are binary circuits and the conductance values of successive conductance branches of the matrix double progressively.

5. Apparatus as claimed in claim 3 and in which said impulse-producing means has means for producing a number Q of impulse per second related to the inputs of successive counters of the plurality of counters of respective counting factors N, M, P, etc., as follows: $Q/N$, $Q/MN$, $Q/MNP$, etc.

6. Apparatus as claimed in claim 3 and in which the plurality of counters is a chain of serially connected decade counters.

7. Apparatus as claimed in claim 3 and in which programming means is provided for controlling at predetermined instants of time the number of impulses fed to the counters.

8. Apparatus as claimed in claim 7 and in which display means is provided responsive to the said output circuit voltage and in which the said programming means controls the instants of display of said voltage.

9. Apparatus as claimed in claim 2 and in which successive conductance branches have conductance values producing a substantially linear relationship between resultant conductance of the matrix and the said impulse measure of said electrical quantity.

10. Apparatus as claimed in claim 2, in which said electrical quantity is the period of a periodic signal and in which said impulse-producing means comprises means for producing a number of pulses depending upon a measure of said period, whereby said voltage in the output circuit represents the frequency of said periodic signal.

References Cited

UNITED STATES PATENTS

| | | | |
|---|---|---|---|
| 2,839,744 | 6/1958 | Slocomb | 340—347 |
| 2,869,115 | 1/1959 | Doelman et al. | 340—347 |
| 3,080,555 | 3/1963 | Vadus et al. | 235—197 |
| 3,264,457 | 8/1966 | Seegmiller et al. | 235—197 |
| 3,030,619 | 4/1962 | Ostrov et al. | 340—347 |

MALCOLM A. MORRISON, *Primary Examiner.*

ROBERT W. WEIG, *Assistant Examiner.*

U.S. Cl. X.R.

324—78